Figure 1:
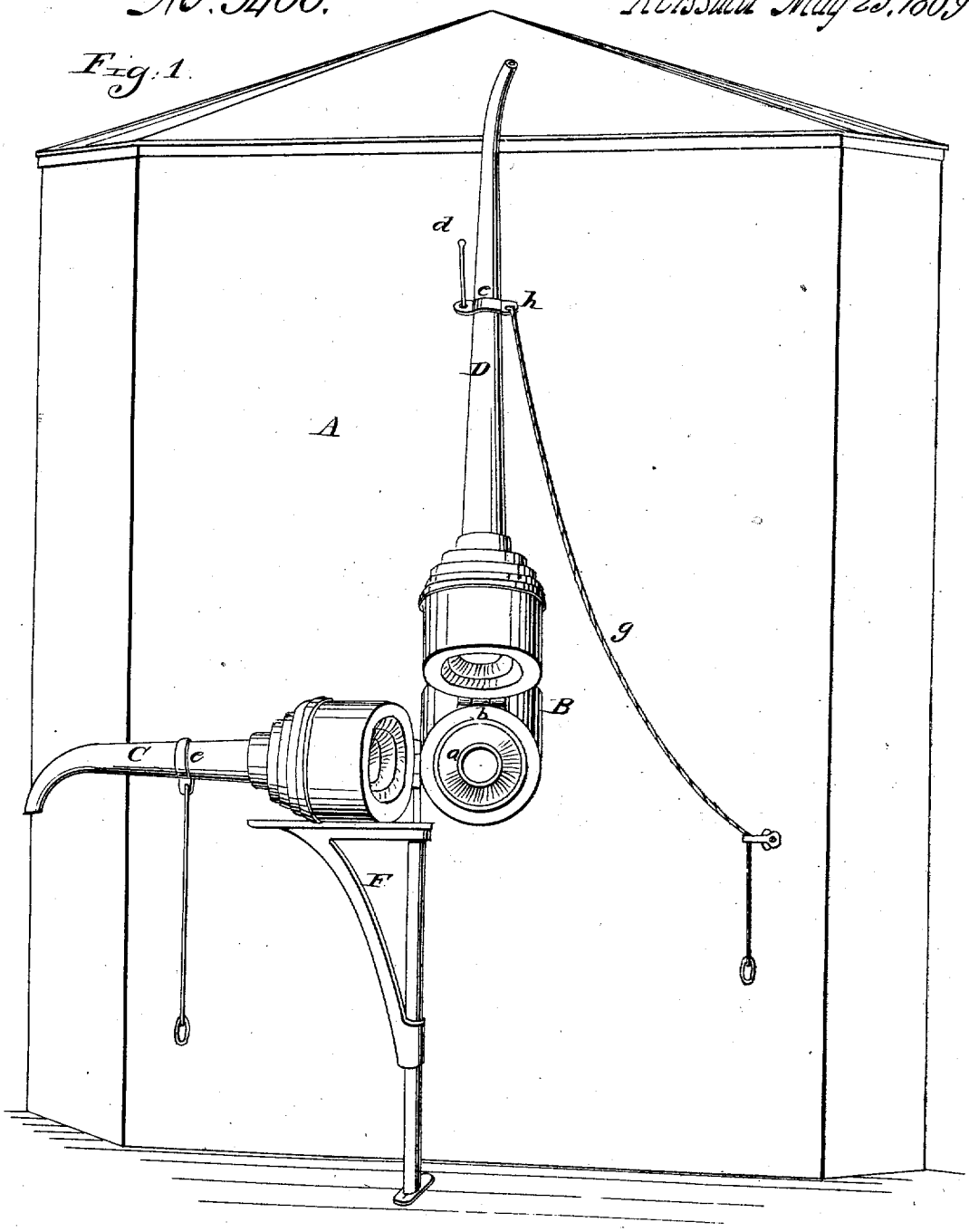

B. M. Van Der Veer.

Water Tank.

No. 3468. Reissued May 25, 1869

Witnesses:

Geo W Rothwell
John A Quedersheile

Inventor:

John Wilkeson Assignee
by C. Mozzens. Atty

N. PETERS, PHOTO-LITHOGRAPHER, WASHINGTON, D. C.

United States Patent Office.

JOHN WILKESON, OF BUFFALO, NEW YORK, ASSIGNEE, BY MESNE ASSIGNMENTS, OF BENJAMIN M. VAN DERVEER.

*Letters Patent No.* 20,108, *dated April* 27, 1858; *reissue No.* 3,468, *dated May* 25, 1869.

APPARATUS FOR SUPPLYING LOCOMOTIVE-TENDERS WITH WATER AT RAILWAY-STATIONS.

The Schedule referred to in these Letters Patent and making part of the same.

*To all whom it may concern:*

Be it known that BENJAMIN VAN DER VEER, of Clyde, in the State of New York, heretofore invented certain new and useful Improvements in Water-Pipes, or Water-Apparatus, for Filling Locomotive-Tender Tanks with Water, at railroad-stations; and that the following is a full, clear, and exact description thereof, reference being had to the drawing, which accompanies and forms a part of this specification, and which represents in perspective a water-house at a railroad-station, fitted with a form of apparatus which embodies the said improvement.

The object of this invention is to provide a water-pipe for the purpose mentioned, which shall not be liable to retain within, or upon it a sufficient quantity of water, after the tender-tank or other receptacle has been filled, to cause, by freezing, any injury to the pipe, or delay, or inconveniene to the engines or engine-men using it, or to produce, by dropping, pools of water around the water-house, which, in summer, are extremely unsightly and disagreeable, and which, in winter, freeze up and become very troublesome.

Prior to this invention, the kinds of apparatus used for this purpose were, in some instances, a piece of hose attached permanently to the water-house, or reservoir, or to a pipe-head secured thereto, and of sufficient length to extend to the filling-hole in the tender-tank, so that when the latter was to be filled, the fireman or engineer could draw the hose down over the tender to the filling-hole, and let the water through, but when a sufficient quantity had been obtained, the hose, after being removed from the filling-hole, would either necessarily fall down and hang against the side of the water-house, or sometimes could be hoisted up against the upper part of the house. But, in either case, considerable water would always remain in the hose, and in warm weather this water would drip on to the ground, and in consequence of the necessarily frequent use of the apparatus, would soon form unsightly and inconvenient pools around the water-house and track, and in winter it would constantly cause the hose to freeze up, and either burst it or require a long time to be spent in thawing it out, thereby necessitating annoying and costly delays to passenger and freight-trains.

In other instances, in order to diminish these inconveniences, no hose would be attached to the water-house, but the engine-man would carry on his engine a separate piece of hose, of the proper length, and when the tender-tank was to be filled, would connect the hose temporarily to the water-house, and after the filling was completed, would disconnect it and stow it away on the tender; but the attaching and removing of the hose consumed more time than was desirable, and, moreover, the hose was often lost, and though carried on the tender, not unfrequently frozen up in cold weather.

In still other cases, removable wooden troughs or spouts were provided at each water-house, adapted to reach from the pipe-head to the filling-hole in the tender-tank, and thereby convey the water to it. When not in use, these troughs or spouts were frequently left leaning against the water-house, or thrown on the ground near it, in readiness for the next engine, and were constantly being lost or stolen, and were also liable to rapid destruction and decay.

These examples sufficiently illustrate the character of this branch of railroad practice prior to the present invention, and all railroad managers are familiar with the heavy expenses occasioned to them, especially during cold weather, from the causes mentioned.

The improvement here to be described has entirely obviated these inconveniences, and is so simple and satisfactory in its operation, that it has gone into use upon nearly every railroad in the northern and western States.

It consists of a pipe, adapted to the conveyance of water, of any suitable material, though preferably of metal, which constitutes a permanent appendage of the water-house, or other water-receptacle, so that it cannot be lost or stolen, and which is so constructed and so combined therewith, that when the tender-tank is to be filled, the engine-attendant can quickly, and without trouble, cause it to form, in connection with the "pipe-head," usually attached to the water-house, a continuous conduit, or passage from the water contained within the latter to the tank, and so that, after the tank has been filled, and when the attendant raises, swings, or turns the pipe out of the way, up against or near to the water-house, to be in readiness for the next engine, he can at once cut off, or break its connection with the "head," or water-receptacle, in such a manner that all, or practically all the water which may remain in it, will instantly run out of it, leaving it clear and dry, so that it cannot freeze or burst under any of the conditions ordinarily occurring in practice.

The invention also consists in the combination, with a water-pipe, having the characteristics described, and with the water-house, or other water-receptacle, of a suitable weight, or counter-balance, so arranged that when the engine-attendant has cut off, or broken the connection of the pipe with the "head," the former, by the action of the weight, will at once be drawn up against or near to the water-house, so as to be out of the way, and yet at all times retained in a convenient position for further use.

The construction and operation of the apparatus, as represented in the drawing, which exhibits one form in which it may be successfully put in practice, is extremely simple, and will be readily understood.

A is the water-house, which may be of the usual, or of any desired construction, and within it may be a suitable reservoir, containing water.

B is a "pipe-head," which enters the building and connects with the reservoir, and is firmly secured to the side of the water-house by a shoulder, and by bolts passing through brace-straps, cast with the "head," or it may be attached to the house in any other convenient manner.

C and D are pipes, adapted to the conveyance of water, and formed preferably of metal, and are both precisely alike, except that one is longer than the other.

Each of them is, as is seen, made separate and distinct from the "head," and in the construction shown in the drawing, is connected or combined with the "head" by a hinge-joint, in such a manner that when it is placed in line with the "head," a continuous conduit, or passage, capable of conveying water, will be formed from the reservoir within the house to the outer end of the pipe, and when it is out of line with the "head," the connection will be cut off, or broken, so that no water can pass through the pipe.

It will also be obvious, that when the connection has thus been broken, if any water is contained, or left in the pipe, it will instantly run, or drop out, and render the pipe quite clear and dry, and wholly free from danger of freezing or bursting.

If desired, a packing may be employed between the pipe and "head," to insure a tight joint, when the pipe is in use, and the drawing illustrates one mode in which this may be effected.

A nipple, *a*, is formed at the extremity of the "head," and at the base of the nipple is a groove, *b*, which is filled with India rubber, or other suitable packing-material, made to project out of the groove somewhat, and consequently, when the pipe is brought to the "head," to form a channel for the water, its base will press upon the packing and make a tight joint. But this packing is by no means essential, and any mode of bringing the pipe and head together, so that water will pass through them without practical loss, will answer the purpose.

The two pipes shown in the drawing will be found convenient, whenever it is desired to be able to fill the tender-tanks of engines standing on different tracks, at unequal distances from the water-house. In such case, the short pipe C may be carried to the tender on the track nearest to the house, and the longer pipe D to the tender on the track farthest from the house.

The construction, combination with the pipe-"head," and operation in conveying the water of each of the pipes, when so used, is, in all respects the same, each being merely a duplicate of the other, except as to length. But, for convenience in sustaining the short pipe D, it may be supported upon the crane E', or its equivalent.

In order to facilitate the raising, or removing out of the way, a pipe constructed and arranged as described, when its connection with the "pipe-head" and reservoir has been broken, a weight, or counter-balance equal to, or a little greater than the weight of the pipe, may be suspended within the water-house, or in any other suitable position, at one end of a chain or rope, which passes over a pulley out of the house, as seen, in the case of the pipe D, at *d* in the drawing, and may be, at its other end, attached, at a proper point, to the pipe, or to a ring on a collar or sleeve, E, thereon.

By this means, the pipe, when no longer required for use, may be automatically drawn back up against the side of the water-house, where it will be conveniently retained out of the way, and not liable to loss or injury, and yet ready for use at any moment.

When required, it may be drawn down by a rope, *g*, attached to another ring, *h*, on the opposite side of the collar, or sleeve E.

It is not essential to this invention that the pipe should be combined with the "pipe-head" by a permanent medium of connection, such as the hinge shown in the drawing, for it is obvious that the improvement herein made over preceding devices, will be found whenever the pipe and "head" are so constructed and combined, that when water is to be conveyed through them, they can be brought together so as to form a continuous conduit from the water-containing receptacle to the outer extremity of the pipe, and can be retained in connection in a manner adapted to permit water to pass through them, and are capable of having their connection cut off, or broken, so that all, or substantially all the water which may remain in the pipe will at once run or drop out, leaving it clear and dry, so that it cannot freeze or burst, under any ordinary circumstances. The hinge shown in the drawing is one means of effecting this connection, but other means may be adopted.

No claim is here made to the combination, with a water-house, or water-receptacle, of a pipe for conveying water, when such combination is considered broadly, nor is any claim made broadly to a water-pipe, separate from the "pipe-head" and used in connection with it when water is to be conveyed, for such devices are found in the separate hose and wooden troughs above referred to; but

What is claimed as the invention of the said BENJAMIN VAN DER VEER, is—

1. The combination, with a water-house, or reservoir, of a pipe-head and water-pipe, when the latter constitutes a permanent appendage of the water-house, and is so constructed and arranged that it is capable of being placed and retained in such connection with the pipe-head as to form a continuous conduit, or passage for water from the interior of the house, or reservoir, through the pipe, and of having its connection with the pipe-head cut off, or broken, in such a manner that any water remaining in the pipe will at once run out, leaving it clear and dry, and thereby obviating all danger of its freezing or bursting, substantially as set forth.

2. The combination, with a water-house, or reservoir and a water-pipe, having the capacities described, of a suitable weight, or counter-balance, so arranged and operating, that when the connection of the pipe with the pipe-head is cut off, or broken, it will automatically raise the pipe, so that any water remaining in it will at once run out, leaving it clear and dry, and will retain it in a convenient position, near to the water-house, in readiness for further use, substantially as and for the purposes specified.

JOHN WILKESON.

Witnesses:

GEO. R. BABCOCK,

M. LOUISE WILKESON.